Patented Jan. 8, 1946

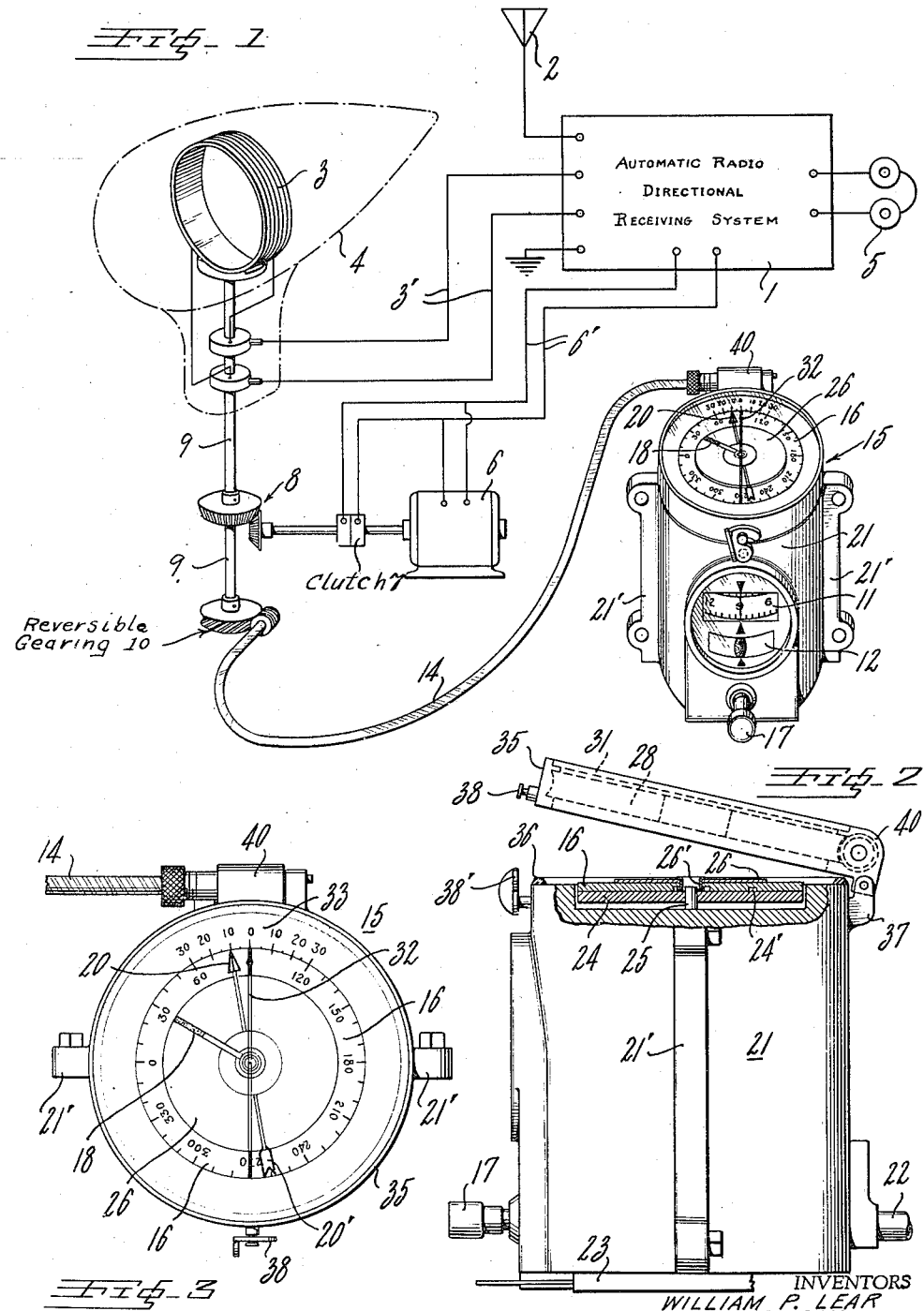

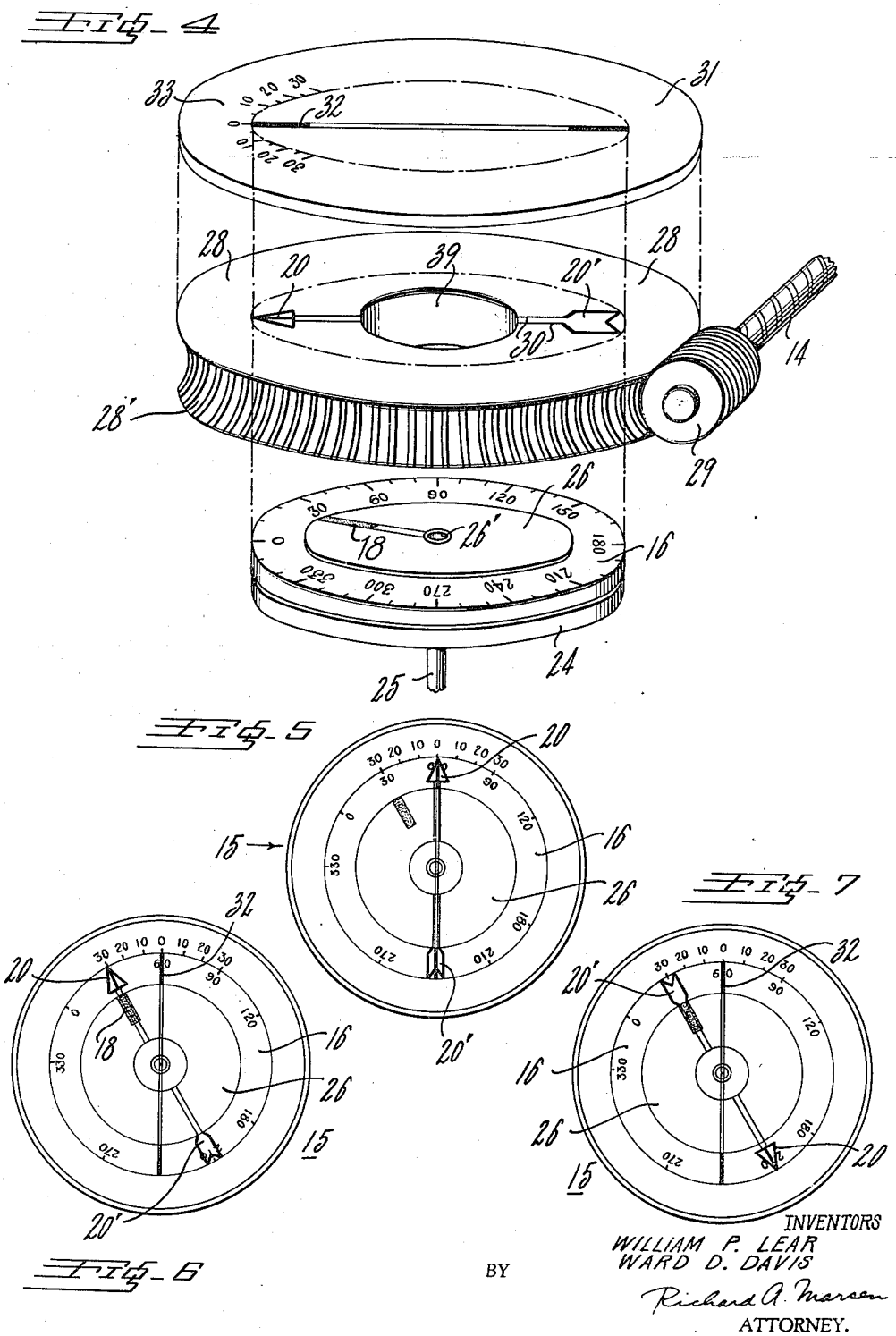

2,392,329

UNITED STATES PATENT OFFICE 2,392,329

GYROMATIC RADIO COMPASS

William P. Lear, Piqua, Ohio, and Ward D. Davis, Baldwin, N. Y., assignors, by mesne assignments, to Lear, Incorporated, Grand Rapids, Mich., a corporation of Illinois Application January 19, 1940, Serial No. 314,672

3 Claims. (Cl. 250—11)

This invention relates to navigational indication systems, and more particularly relates to a novel composite indicator directly solving and simplifying heretofore complex problems in aircraft navigation.

The trend of modern aircraft navigation is towards greater safety and reliability of operations and schedules as well as towards greater flexibility of maneuvering. Efforts have been directed to provide indications to effectively guide the pilot in his navigation despite difficult terrain or adverse weather conditions such as wind, rain, fog, and the like. The art, however, has developed complex systems for these purposes, requiring correlation of a number of separate indications, interpretations, and numerical calculations on the part of the already burdened pilot, as well as requiring a multitude of special ground radio and associated equipment.

In accordance with the present invention, aircraft navigation is reduced to simple terms, continuously affording the pilot automatic pictorial indications of his orientations and maneuvers, and reducing even the most advanced problems to simple, readily interpreted indications. The pilot is thus relieved of mental strain and uncertainty as to position or orientation, and is directly apprised of the best and most direct manner to navigate his aircraft under all conditions of flight. The only ground facility required in conjunction with the system of the invention is a single radio transmitter, of any type, in the vicinity or in the path of the destination.

With the system of the present invention, straight-track navigation along any desired radial heading is readily effected towards or away from a radio station, despite cross-winds or non-visibility. The angle of drift of the aircraft due to cross-winds is directly indicated, and automatically corrected for in flight. The composite instrument may be used as a regular 360° automatic radio direction finder and as a gyro-compass. With the system the pilot is enabled to confidently execute a direct low approach and blind descent onto a runway, regardless of local weather conditions. For blind landing, the transmitter is located at the head of the selected runway.

The composite navigational indicator comprises a course index held annularly fixed in space parallel to the destination of the desired course, and an index giving an accurate bearing on a radio station in the path of the desired course. A further reference index is provided corresponding to the zero heading or "lubber line" of the aircraft. The "desired course" index is continuously orientated with a directional gyroscope or gyro-compass, or with a magnetic compass. The "radio course" index is controlled by a 360° automatic radio direction finder system tuned to the charted ground radio station. The composite navigational indicator accordingly performs the functions of a radio direction finder and a directional compass, as well as the important additional functions referred to above and to be described in detail hereinafter.

It is accordingly an object of the present invention to provide a novel composite navigational indication system.

A further object of the present invention is to provide a novel navigational indicator directly resolving navigational problems into simple terms.

Still a further object of the present invention is to provide a composite pictorial navigational indicator combining 360° radio directional bearings with an adjustable index laterally held angularly fixed in space.

Another object of the present invention is to provide a novel composite navigational indicator having an adjustable course index orientated by an air-driven gyro-compass.

These and further objects of the present invention will become more apparent in the following description of a preferred embodiment thereof illustrated in the drawings, in which:

Fig. 1 is a diagrammatic arrangement of the preferred embodiment of the navigational system of the invention.

Fig. 2 is an elevational view, partly in section, of the navigational indicator.

Fig. 3 is a plan view of the navigational indicator.

Fig. 4 is a diagrammatic blown-up illustration of the essential components of the navigational indicator of the invention.

Figs. 5, 6 and 7 illustrate some indications occurring in practice on the navigational indicator.

A preferred arrangement which the system of the present invention may assume in practice is diagrammatically illustrated in Fig. 1. The radio direction finder section of the system gives automatic indications over 360 degrees, and may well be in one disclosed in the copending application, Serial No. 286,733, filed July 27, 1939, entitled "Automatic radio direction indicator." now Patent No. 2,308,521 issued January 19, 1943, assigned to the same assignee as this case. Equivalent automatic direction finders, capable of operating a bearing indicator over a 360° scale and give a bearing on a tuned-in radio station, may instead be used. The illustrated direction finder comprises radio receiver and control circuit unit indicated at 1, to which is connected non-directional antenna 2 and rotatable directional or loop antenna 3 through leads 3'. A streamline housing about loop antenna 3, indicated in dotted lines at 4, is used to reduce the aerodynamic drag of the loop antenna when mounted exterior of the aircraft. Earphones 5 are connected to direction finder unit 1 for continuous aural reception, useful for identifying the radio station tuned-in and for obtaining weather reports or landing instructions.

A reversible motor 6 is connected to the control circuit portion of direction finder unit 1 through leads 6', and is energized in accordance with the received radio signals to rotate in either direction in accordance with the sense of the radio signal as determined by the loop antenna 3 when off-null position with respect to the incoming radio signal waves. The circuits and theory of this operation is described in my above Patent No. 2,308,521. Motor 6 is coupled to drive loop antenna 3 through electromagnetic clutch 7 electrically connected in parallel with motor 6; reduction bevel gearing 8; and loop shaft 9.

The composite navigational indicator is shown at 15. It is mechanically coupled to loop antenna 3 through flexible mechanical cable 14 directly connected to loop shaft 9 through gearing 10. The indicator 15 is shown in perspective in Fig. 1; in elevation and partly in section, in enlarged Fig. 2; in plan view, in Fig. 3; and as a diagrammatic blown-up view, in Fig. 4. Indicator 15 is mounted in the cockpit adjacent the pilot with its scales preferably arranged horizontally. Navigational indicator 15 embodies a directional gyroscope or gyro-compass arranged to maintain directional scale 16 in predetermined orientations. Directional scale 16 is graduated in 360 degrees, and represents the land reference scale of the composite indicator. A vertically viewed gyroscale 11 may be incorporated in navigational instrument 15. Directional scale 11 is a 360° scale, corresponding identically with horizontal gyroscale 16, and moved in synchronism therewith. An inclinometer 12 is arranged near gyro-compass scale 11 as indicated. Scale 11 and inclinometer 12 are optional.

A caging knob 17 is coupled to the internal gyro-compass mechanism for periodically resetting directional scale 16 to correspond with the magnetic compass readings. The reading of gyro-scale 16 as referred to the zero index of indicator 15 is made identical with the reading, in degrees, of the magnetic compass in the aircraft. True course bearings, with respect to north as ascertained from a map, are correlated with the magnetic compass readings and therefore with the gyro-scale 16 readings by taking into account magnetic variations, easterly or westerly, and magnetic deviations of the magnetic compass, as will be set forth hereinafter. A "desired course" index 18 is marked upon disk 26 which is adjustably mounted with respect to gyro-scale 16. A "radio course" index 20, 20' is marked on transparent gear 28 mounted above directional scale 16 and "desired course" index 18. Radio course index 20, 20' is directly controlled by flexible cable 14; and is moved in exact correspondence with loop antenna 3 by the automatic radio directional receiving system, through motor 6.

The gyro-compass mechanism is contained within cylindrical housing 21. It is preferably an air-driven type. A tube 22 projects from housing 21 for connection to a vacuum source to drive the gyroscope mechanism, not shown but well known in the art. An air filter 23 is used to purify the drawn-in air. The 360° gyro-scale 16 is in the form of a disk mounted in a predetermined orientation on horizontal turn-table 24 through a locating pin 24'. Turn-table 24 is connected to vertical shaft 25 extending from the gyro-compass mechanism. Gyro-compass units per se are well known in the art, and may take optional forms. Details thereof are accordingly not shown in the drawings. The directional gyroscope is arranged to maintain the orientation of turn-table 24 and scale 16 fixed in a set-up direction, regardless of changes of attitude of the aircraft or of casing 21. Mounting lugs 21' project from housing 21 for mounting purposes.

Shaft 25 of turn-table 24 may for example be connected to the vertical ring of the gyro-compass, not shown in the drawings, but indicated as within casing 21. The horizontal turn-table 24 driven by the gyro-compass unit, and the associated caging arrangement (17) corresponds to the airport orientator instrument manufactured by the Sperry Gyroscope Company, Inc. of New York and described and illustrated in their publication entitled "Airport Orientator," dated October, 1938. The caging mechanism for controlling the relative setting of turn-table 24 with respect to the zero index of indicator 15, is operated by caging knob 17 directly geared to the contained gyro-compass mechanism. Suitable caging mechanisms are, for example, shown in the gyro-compasses of U. S. patents, Nos. 2,052,866 and 2,061,894.

Disk 26 is marked with "desired course" index 18. Disk 26 is adjustably mounted centrally of turn-table 24 onto scale disk 16 with a suitable clip or eyelet 26'. The "radio course" index 20, 20' is inscribed on the transparent gear 28 meshing with worm 29 coupled to mechanism shaft 14. The portions 20, 20' of the "radio course" index are visually aligned by two parallel lines 30. Transparent cover 31 of navigational instrument 15 contains the aircraft reference index or "lubber line" 32, fixedly pointing to the zero index of scale 33. Scale 33 is calibrated in degrees, equally from either side of 0°.

Transparent cover 31 of the instrument is sealed into the rigid metallic lid 35 to prevent air leakage around its edges. A rubber gasket 36 is mounted at the top inside surface of housing 21. Lid 35 is pivotally secured to housing 21 on projection 37 thereof. It is clamped down onto gasket 36 during normal operation of the system by pin and latch 38, 38' maintaining a sealed condition for proper functioning of the contained air-driven gyro-compass mechanism. Lid 35 is unlatched and opened to the position illustrated, in Fig. 2, when the adjustable "desired course" index 18 is to be reset with respect to gyro-scale 16 as will be described in further detail hereinafter. Transparent "radio course" gear 28 is floatingly mounted within lid 35, i. e., it is arranged for free rotation. Gear 28 contains a central hole or opening 39. Opening 39 prevents frictional interference or freezing of the rotation of gear 28 due to the vacuum exerted on the gyro-compass unit within the instrument.

A preferred material for the "radio course" gear 28 containing index 20, 20' is the transparent plastic commercially known as "Lucite." The gear teeth 28' of gear 28 may be molded into its periphery or, preferably, directly cut thereon on a lathe. The opening 39 of gear 28 permits the proper mounting thereof on a mandril of a lathe, for cutting the teeth 28' therein. Worm 29 is rotatably mounted in extension 40 of lid 35, and meshes with floatingly mounted worm gear 28. The respective components of the indicator 15 are designed and constructed to prevent air leakage into the instrument except through the filter provided at 23.

The "desired course" index 18 is preferably a luminous bar arranged on the metallic disk 26 in the manner shown, composed of a phosphorescent or luminous material, such as a radium compound used in instrument marking. To avoid unbalancing of the turn-table 24 and effect undesirable precession in the operation of the gyroscope, a similar mass of luminous material is arranged symmetrically opposite index 18 on the reverse side of disk 26. Absorption of moisture by the luminous compound during humid weather is thus compensated for weight increase at diametrically opposite points equi-distant from the center of rotation of turn-table 24. Precession effects are thus balanced out.

*Aircraft navigation with the composite indicator*

The composite navigational indicator of the present invention automatically and accurately informs the pilot how best to navigate the aircraft under all conditions of flight. Problems in aircraft navigation are directly resolved, relieving the pilot of mental strain, calculations and uncertainty. The indications are quickly and easily interpreted, reducing the most advanced navigational problems to simple terms. With the system, a pilot can readily fly "blind" along any desired radio course, heading towards or away from any radio station in any desired radial direction, and traveling a predetermined straight track over the ground regardless of wind force or direction. The angle of drift or crab of the aircraft due to cross-winds is directly ascertained by the indications, and automatically corrected for in flight. The composite instrument of the invention serves as the usual directional gyroscope or gyro-compass in the aircraft, thus eliminating the installation of a separate one. The automatic uni-directional 360° radio course indicator incorporated in the system may be used independently as such for homing, and radio directional flight in general. A distinct indication is obtained when the aircraft passes over the radio station by a 180° reversal of the "radio course" index (20, 20'). The system is also most advantageously used for effecting a low approach and blind landing on a selected runway.

Only a single ground radio transmitter station is necessary for navigation with the instrument of the invention. The largest airliner, bomber or clipper may be navigated on a straight-track to any out-of-the-way airport having a simple radio transmitter and safely "blind-landed" on the local airport or seaport. The pilot simply tunes-in the radio station, ascertains the selected course or runway in degrees, sets his "desired course" index 18 accordingly, and is then prepared to effect a direct instrument approach and blind descent to the runway. The navigation and landing maneuvers are rendered foolproof and safe regardless of wind velocity or other weather conditions.

The basic principle of the indications of the system of the invention is readily comprehended by the pilot. It consists in correlating:

(1) A course index (18) held angularly fixed in space parallel to the desired course; with
(2) A continuous bearing (20) on a radio station on the course; together with (3) A reference index (32) of the aircraft itself.

Each indication may be used independently of the other. However, when correlated, they directly and automatically resolve navigation problems for the pilot.

Straight track navigation towards a radio station is effected, automatically compensated for drift due to cross-winds, by maintaining "radio course" index 20 coincident with "desired course" index 18. The angle which coincident indices 18 and 20 makes with "lubber line" 32 is the drift angle of the aircraft, indicating the attitude of the aircraft with respect to the course of flight. The pilot, in a similar manner, can fly a predetermined straight track in any radial direction away from a radio station by keeping tail 20' of the "radio course" indicator coincident with "desired course" index 18.

The three indices tell the pilot the whole story in the simplest pictorial terms. Interpretation of the readings is practically intuitive. All navigational maneuvers are performed by the pilot with a minimum of calculation or interpretation. Only a single ground radio transmitter is necessary to complete the whole system, which station may be a commercial broadcast station, simple voice transmitter, Coast Guard station, radio range, etc.

The setting in degrees of "desired course" index 18 with respect to scale 16 depends on several navigational factors. The "desired course" is identical in degrees with the "magnetic compass course" for the destination, in degrees. The primary factor entering into the determination of the "magnetic compass course" and the "desired course" is the bearing in degrees of the course or destination of flight with respect to true north. Such true bearing is generally termed the "true course." The easterly or westerly magnetic variation, in degrees, for the vicinity, is respectively subtracted from or added to the "true course" to derive the "magnetic course." In a similar manner, deviation in degrees of the actual magnetic compass readings from true magnetic readings is used to correct the "magnetic course" to arrive at the desired "magnetic compass course," or generally termed "compass course."

The "compass course" is the degrees as read on the magnetic compass for straight alignment to a destination from a given position. The significance and mode of the "compass course" determination is well known to those versed in the art of navigation, and is clearly explained in Chapter III of the publication "Practical Air Navigation" by Thorburn C. Lyon of the U. S. Department of Commerce, published in 1939 by the U. S. Government Printing Office, Washington.

The "desired course" index 18 is adjusted to read the "compass course" for the destination. This is accomplished manually by the pilot. Caging knob 17 is moved to cage the air-driven gyro-compass mechanism, cutting off the suction thereto. This permits lid 35 to be raised for resetting index 18 without drawing in unfiltered air. Lid 35 is unlatched and opened as indicated in Fig. 2. "Desired course" index 18 is rotated to point opposite the desired, calculated, angular position on gyro-scale 16. After "desired course" index 18 is set, the reading of directional scale 16 with respect to the zero index of "lubber line" 32 is made to correspond identically with the reading on the magnetic compass of the aircraft. The caging knob 17 is then replaced to its normal operating position and the composite indicator 15 of the invention is in adjustment for the navigational guidance.

Figs. 5, 6 and 7 illustrate typical indications by the composite indicator of the invention during flight conditions. Fig. 5 represents "homing" flight direct to a radio transmitter. The directional radio receiver (1) is tuned to the desired radio station, and "radio course" index head 20 is maintained coincident with "lubber line" 32, as shown. Its use in this case, is similar to a regular directional finder. The setting of the "desired course" index (18) is 30°. When the aircraft passes over and beyond the radio station it is tuned to, the "radio course" index (20, 20') reverses its indication by 180°, serving as a marker indication of the site of the radio station.

An important feature of the present invention resides in the feasibility of straight-track navigation towards or away from a desired radio station in any radial direction. The straight-track navigation is effected by keeping the "radio course" index 20, 20' aligned with "desired course" index 18, and disregarding their position of alignment relative to the "lubber line" 32. In Fig. 6, the alignment of "radio course" head 20 with the "desired course" index 18, signifies that straight-track navigation is being executed directly towards the radio station on the ground. The radio station has a course bearing corresponding to the setting of the "desired course" index 18 on the gyro-scale 16, being 30° in the present case. This 30° setting as the "desired course," corresponds to the desired magnetic compass course, as described. It is the true course bearing (with respect to true north) as obtained on a map, corrected for magnetic deviation (westerly or easterly) and for magnetic deviation of the magnetic compass itself, as is understood by those skilled in the art of navigation. The angle between the lubber line 32 and the two aligned indices 18, 20 is the attitude of the aircraft in flight along the desired straight track path.

In Fig. 6 the attitude of the aircraft is about 30° to the right of its course, compensating for cross-wind from the right. By maneuvering his aircraft to align the "radio course" and "desired course" indices 18 and 20, the pilot automatically assumes the proper drift angle or attitude of the aircraft, the magnitude and sense of this angle being pictorially indicated on the instrument for the pilot. The flight path in Fig. 6 is at the desired radial direction with respect to the radio station, and towards the station. As the pilot continues to his destination, the "radio course" and "desired course" indices 18 and 20 remain aligned for a straight-track course to the station, straight with respect to ground. The attitude of the aircraft changes in accordance with the changing velocity of cross-winds, evidenced by the divergence of the lubber line 32 from the aligned indices.

When the pilot passes over the radio station on the straight-track path, the "radio course" index 20, 20' reverses by 180° so that the head 20 thereof continues to point to the radio station. In this position, the tail 20' of the "radio course" index is aligned with the "desired course" 18 as shown in Fig. 7. The angle of drift remains the same, since it represents a continuation of the same attitude of the aircraft with respect to the straight-track path, upon passing over the radio station. Should the cross-wind come from the left rather than the right, the aircraft is necessarily crabbed at an angle facing left with respect to the aligned straight-tracking indices 18, 20. The sense and magnitude of the drift angle depends upon the direction and force of the crosswind.

The composite navigational indicator arrangement and system of the present invention may be used as a 360° automatic radio direction finder; as a gyro-compass; as an automatic drift indicator and compensator; for straight-track navigation to any radio station along any desired radio direction with respect thereto; for confident radio range navigation; and as a runway localizer for low approach and "blind" landing onto a selected runway. With these fundamental operations the pilot may employ the system to advantage with practically all types of maneuvers which occur in practice.

In "blind" landing, a radio transmitter is located at the head of a selected runway, the pilot being informed of the bearing of the runway selected by voice communication. The pilot either "homes" or straight-tracks directly to the runway radio station, then executes a turn to fly away from the runway for a predetermined interval, such as three minutes. The "desired course" indicator (18) is set to correspond to the bearing of the selected runway. The pilot then makes a 180° turn and employs the composite indicator of the invention as a runway localizer for straight-track flight to the runway and executes a low approach thereto. He gradually reduces his elevation. He knows the exact instant when he passes over the radio transmitter stationed ahead of the runway by the 180° reversal of the "radio course" index (20, 20'). He should have about a 200 foot elevation at that time. He reduces the speed of his craft to about 75 to 85 miles per hour, and descends to the runway by rapidly dropping his elevation.

The navigational indicator of the present invention is useful for all navigational maneuvers and problems which may be encountered in private, commercial, military, or naval operations. Its operation requires a simple radio transmitter ground station, enabling the use of any type of radio transmitter encountered in the course of navigation. This factor adds to the reliability of the navigational guidance with the system of the invention along any terrain which may be encountered in practice. It also reduces to an absolute minimum the cost and complexity of ground radio facilities required for radio guidance or blind landing on an airport. The same ground station can be used for communication with the pilot for station identification, weather reports or flying and landing instructions.

Although a preferred embodiment of the invention has been disclosed, it is to be understood that modifications falling within the broader spirit and scope of the invention are feasible, and accordingly we do not intened to be limited except as set forth in the following claims.

We claim:

1. A navigational instrument of the character described comprising an air-driven gyro-compass, a turn-table coupled to said gyro-compass for constant lateral orientation thereby, a disk containing a radial desired course index marking mounted for rotation with said turn-table and adjustably positionable thereon in any desired angular relation, a casing for said gyro-compass having a hinged lid above said turn-table and disk, a member rotatably supported in said lid above said turn-table and containing a radially disposed radio course index, the axes of rotation of said desired course and radio course indices being coincident and said indices being simultaneously visible, an element rotatably supported in said lid in driving engagement with said member, a pane mounted in said lid containing a stationary radial reference index for said rotatable desired course and radio course indices, and means for sealing said gyro-compass and indices within said casing and lid with respect to the external atmosphere when the lid is closed on said casing.

2. The method of navigating an aircraft over any predetermined straight course upon which a radio transmitter lies, utilizing two directional indices, comprising continuously orientating one directional index to point in the direction to the radio transmitter regardless of the direction of flight of the aircraft, adjusting the other directional index to point in a direction parallel with the predetermined straight course and maintaining it in continuous spatial parallelism with the course, and manipulating the aircraft to hold both continuously oriented directional indices in substantial alignment to effect straight-tracking of the aircraft over the predetermined course.

3. A navigational instrument for an aircraft comprising a directional compass, a rotatable compass platform containing a circular scale coupled to said directional compass for continuous fixed lateral orientation, a desired course index member mounted for rotation with said compass platform, said desired course index member being angularly adjustable on said compass platform with respect to said scale into a desired lateral straight course of flight for the aircraft, a housing containing a lid portion, a first gear element rotatably mounted within said lid portion, a radio course index member carried by said first gear element with its axis of rotation coincident with those of said compass platform and said desired course index member, and a second gear element rotatably mounted in said lid portion in driving engagement with said first gear element and having a portion for external mechanical coupling thereto.

WILLIAM P. LEAR.
WARD D. DAVIS.